(No Model.)

F. A. PEEBLES.
FARM GATE.

No. 298,620. Patented May 13, 1884.

WITNESSES
W. Engel
Geo. W. King

INVENTOR
Francis A. Peebles
By Leggett & Leggett ATTORNEYS

UNITED STATES PATENT OFFICE.

FRANCIS A. PEEBLES, OF HINCKLEY, OHIO.

FARM-GATE.

SPECIFICATION forming part of Letters Patent No. 298,620, dated May 13, 1884.

Application filed September 15, 1883. (No model.)

*To all whom it may concern:*

Be it known that I, FRANCIS A. PEEBLES, of Hinckley, in the county of Medina and State of Ohio, have invented certain new and useful Improvements in Farm-Gates; and I do hereby declare the following to be a full, clear, and exact description of the invention, such as will enable others skilled in the art to which it pertains to make and use the same.

My invention relates to improvements in farm-gates; and it consists in certain features of construction and in combinations of parts hereinafter described, and pointed out in the claims.

Figure 1:
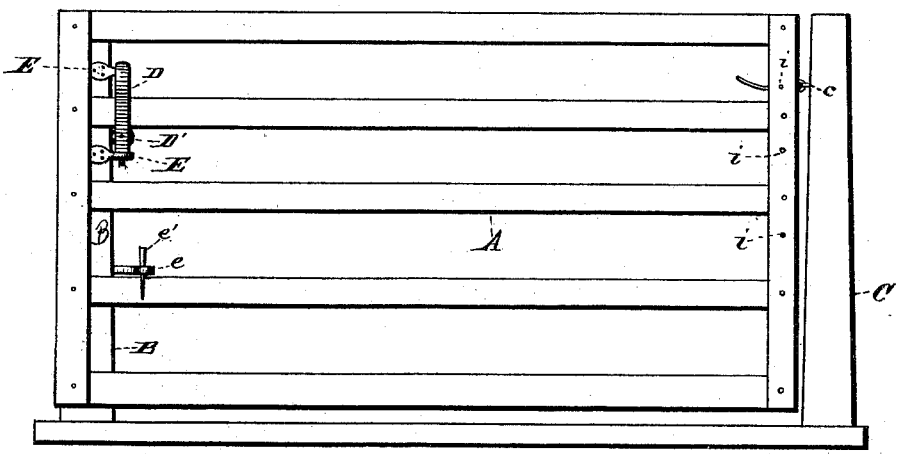
Figure 2:
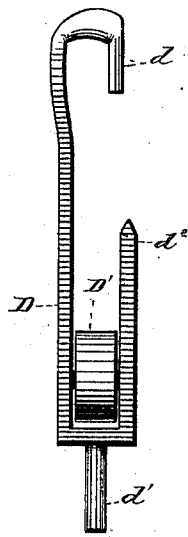
Figure 3:
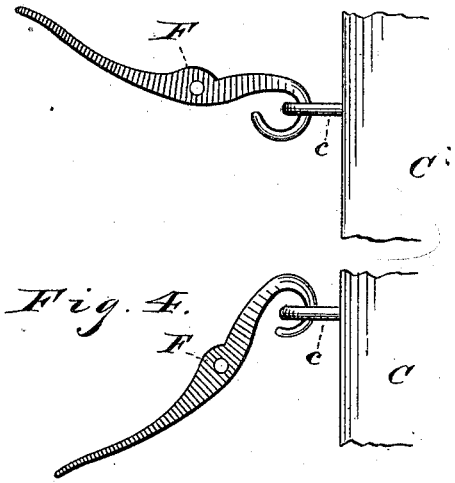
Figure 4:
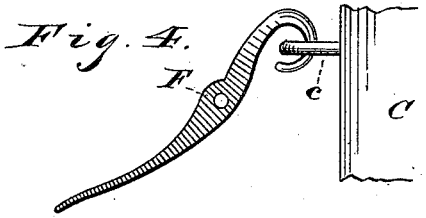

In the drawings, Figure 1 is a side elevation of my improved gate. Figs. 2, 3, and 4 are views in detail.

A represents the gate, made in the usual manner, with bars secured at each end by uprights, and may be fastened together in any manner desired.

B is the post to which the gate is hung, and C the post to which the gate is fastened when closed.

The part D is made in the form shown in Fig. 2, and supports the pulley D', and is provided with the pivotal parts $d$ and $d'$, that loosely engage holes or eyes in the hinges or brackets E, attached to the part B. The part that terminates at $d^2$ and the opposite side form together guides to hold the bar on the roller D'. There is room between the points $d$ and $d^2$ to admit a bar of the gate, and when the parts are in position, as shown in Fig. 1, the gate is supported by the said roller, and may be run backward and forward thereon; or the gate may be turned sidewise by means of the pivotal points $d$ and $d'$.

It will be seen that the part $e$ extends from the post just above one of the rails of the gate, and has a hole in which is placed the vertical peg $e'$, that passes down on the outside of the bar and prevents the gate from swinging out at the bottom, while the part $e$ prevents the gate from being raised. If the peg $e'$ were removed and the gate swung out from under the part $e$, the gate and the part D may be raised together and the latter disengaged from the holes in the brackets or hinges E, after which the part D may be removed and placed on a lower bar of the gate, which, of course, would raise the gate higher. The part D, embracing the desired bar, may now be returned to its bearings on the hinges or brackets E, and the gate brought to its proper position and the peg $e$ returned to its place, the parts $e$ and $e'$ engaging a lower rail than in the position shown in Fig. 1.

In the construction shown the gate could be raised only one bar; but the gate may be made of any desired number of bars, so that the gate may be raised any desired distance.

When deep snows or other obstructions occur, or when it is desired to admit the passage of small animals, the gate may be raised as aforesaid.

Animals frequently become experts in opening gates that are provided with ordinary fastenings. I have therefore devised the mechanism shown in Figs. 3 and 4. This consists of the bent lever F, fulcrumed in the central part, and provided with a hook at one end to engage the staple $c$, attached to the post C. The hook is bent around so far that it cannot be disengaged from the staple, except the lever is in about the position shown in Fig. 4. The hook end is heavier than the thumb-piece, so that the lever will not assume the said inclined position unless the left-hand end or thumb-piece be pressed down. This is easily accomplished, as the thumb-piece and the bar next below it may be grasped in one hand, as is shown in Fig. 1. While held in this position, by raising this end of the gate and drawing the gate close to the post C, the hook can be disengaged from the staple. Different holes, as at $i$, may be made for the pin that fulcrums the lever F, so that when the gate is raised and operated on lower bars the said hooked lever F may be placed in proper position to engage the staple.

This device for fastening a gate is believed to be secure as against animals.

What I claim is—

1. The combination, with a gate-post provided with brackets, and a gate, of the hanger D, constructed substantially as described, and pivotally secured to the brackets, and the arm e and peg e', substantially as set forth.

2. The combination, with gate-posts and a gate, of the brackets secured to one of the posts, the removable hanger D, the staple secured to the other post, and the vertically-adjustable hook F, all of the above parts being combined as described.

In testimony whereof I sign this specification, in the presence of two witnesses, this 8th day of September, 1883.

FRANCIS A. PEEBLES.

Witnesses:
C. W. WAIT,
WILLIAM CROOKS.